(12) United States Patent
Gale et al.

(10) Patent No.: US 6,268,590 B1
(45) Date of Patent: Jul. 31, 2001

(54) APPARATUS AND METHOD FOR CONTINUOUS RETORTING OF MERCURY FROM ORES AND OTHERS MERCURY CONTAMINATED MATERIALS

(75) Inventors: Charles O. Gale; Eldan L. Hill, both of Bountiful, UT (US)

(73) Assignee: Summit Valley Equipment and Engineering, Corp., UT (US)

(*) Notice: Subject to any disclaimer, the term of this patent is extended or adjusted under 35 U.S.C. 154(b) by 0 days.

(21) Appl. No.: 09/519,347

(22) Filed: Mar. 6, 2000

(51) Int. Cl.[7] .............. C22B 43/00; F27B 9/04; F27B 9/38; F27D 7/06
(52) U.S. Cl. .......... 219/388; 219/389; 219/407; 373/111; 373/112; 373/115; 75/401; 75/670
(58) Field of Search .................... 219/388, 389, 219/407; 373/111, 112, 115; 432/112, 152, 154; 201/4; 110/203, 216; 422/287, 288; 75/401, 419, 670

(56) References Cited

U.S. PATENT DOCUMENTS

| | | | |
|---|---|---|---|
| 3,037,759 | * 6/1962 | Smith | 266/145 |
| 3,802,847 | * 4/1974 | Hara et al. | 219/389 |
| 3,802,869 | * 4/1974 | Duane et al. | 75/419 |
| 4,031,354 | * 6/1977 | D'Souza | 219/389 |
| 4,296,072 | * 10/1981 | Takacs et al. | 422/287 |
| 4,941,822 | * 7/1990 | Evans et al. | 432/112 |
| 4,958,578 | * 9/1990 | Houser | 110/216 |
| 5,184,950 | * 2/1993 | Fraysse et al. | 110/246 |
| 5,499,586 | * 3/1996 | Davis | 110/246 |
| 5,523,060 | * 6/1996 | Hogan | 422/184.1 |
| 5,567,223 | * 10/1996 | Lindgren et al. | 75/401 |
| 5,569,154 | * 10/1996 | Navetta | 75/670 |
| 5,632,863 | * 5/1997 | Meador | 201/4 |
| 5,782,188 | * 7/1998 | Evans et al. | 110/216 |
| 5,944,196 | * 8/1999 | Oram et al. | 209/158 |
| 5,989,486 | * 11/1999 | Washburn et al. | 75/670 |
| 6,024,931 | * 2/2000 | Hanulik | 423/107 |

FOREIGN PATENT DOCUMENTS

2140141 * 11/1984 (GB).

* cited by examiner

*Primary Examiner*—Joseph Pelham
(74) *Attorney, Agent, or Firm*—Mallinckrodt & Mallinckrodt; Brian R. Rayve

(57) ABSTRACT

A mercury retorting apparatus, a retorting system, and a method for continuous removal of mercury from dry, semi-granular, and sludge materials contaminated with mercury without shutting down the system for removal of accumulated liquid mercury, water, and dust particles. The retorting apparatus comprises a powered screw feed assembly having a feed tube with a closely fitting feed screw therein. The screw feed assembly feeds the material from the lower portion of a hopper configured to contain a quantity thereof into a rotatably powered retorting tube in which a vacuum is drawn. The material forms a seal within the powered screw feed assembly against vacuum loss in the retorting tube during operation thereof. A first rotatable seal between the feed tube and retorting tube prevents vacuum loss therebetween. An elongate electric kiln encloses the mid-portion of the retorting tube. An output hopper for receiving retorted material from the retorting tube is connected to the opposite end thereof by means of a second rotary seal. An outlet pipe assembly extends downwardly from the outlet hopper having an outlet pipe with a valved airlock to allow retorted material to pass therethrough. An off gas outlet pipe extends from the output hopper for removing off gasses containing mercury vapor for collection. The mercury retorting system comprises the mercury retorting apparatus, a pair of valved mercury recovery systems connected in parallel to the retorting apparatus for condensing the mercury vapor from the offgasses, and a vacuum pump connected to the mercury recovery systems.

3 Claims, 4 Drawing Sheets

Figure 1:
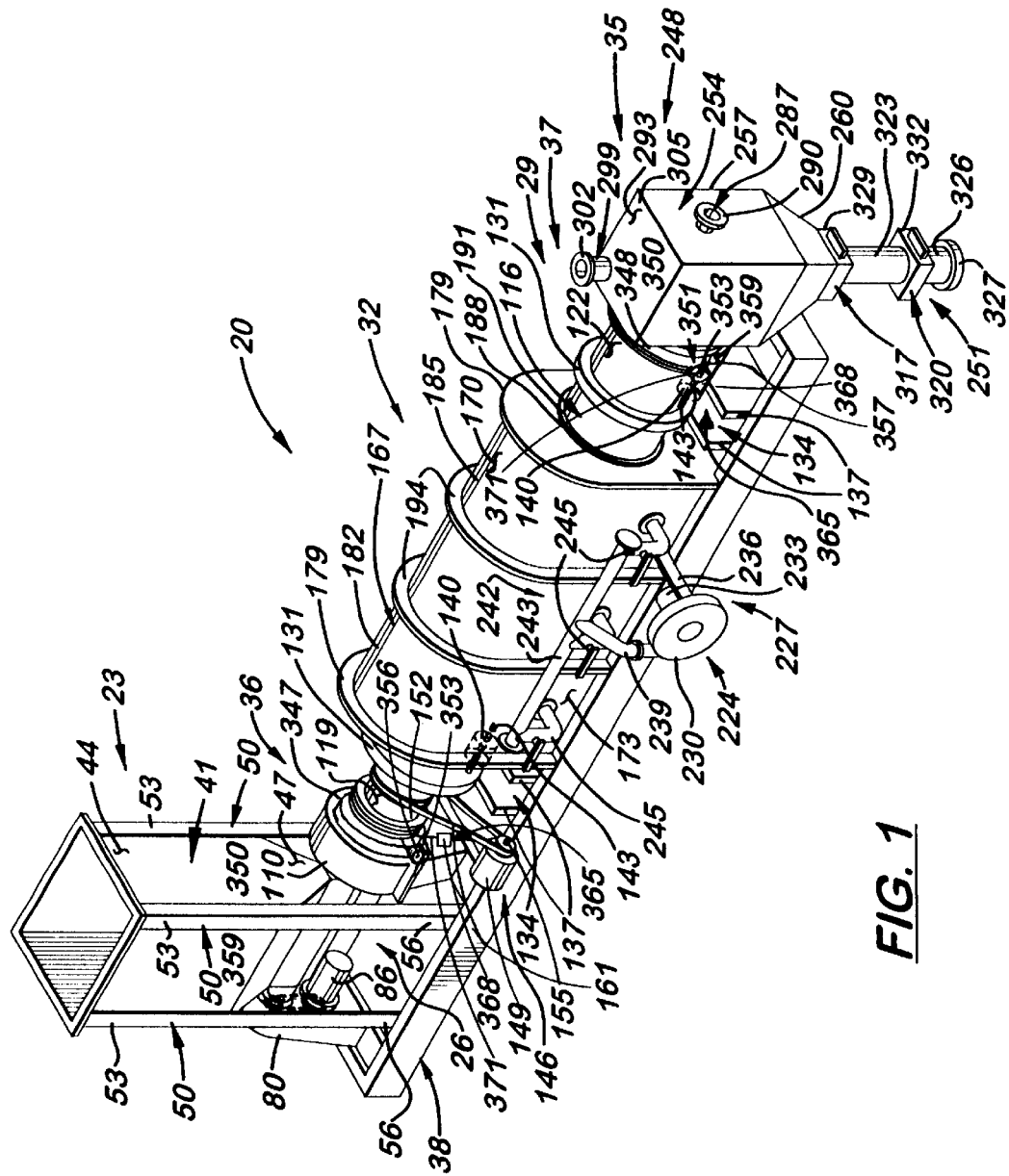

APPARATUS AND METHOD FOR CONTINUOUS RETORTING OF MERCURY FROM ORES AND OTHERS MERCURY CONTAMINATED MATERIALS

BACKGROUND OF THE INVENTION

1. Field

The field of the invention is retorting apparatuses and methods for removal of mercury from ores and mercury contaminated materials.

2. State of the Art

Mercury is a toxic material to many living organisms, including humans, and its presence in ores or in other materials constitutes a hazard during processing of such materials. The mercury contained in such ore is generally in elemental form, or alloy form (amalgam), or as a sulfide, all of such forms which are easily vaporized. Since the refining of such ores often involves the application of heat, the mercury tends to change to highly toxic vapor.

Removal of the mercury by retorting involves the application of heat to the ore or other mercury bearing material to cause vaporization. The ore is heated in a reduced pressure environment to accelerate the vaporization. Such process has typically been a relatively slow, batch type process wherein the mercury bearing material is thinly spread upon trays or pans within a heating oven to minimize the distance the mercury must migrate through the ore. The oven must be shut down and allowed to thoroughly cool before the pans can be removed and replaced with fresh, unretorted material. Other processes include placing the mercury bearing material within a vacuum container which is then heated while the material is stirred by a plurality of rotary paddles. While this process is quicker, it is still a batch process requiring the loading and unloading of batches of material.

U.S. Pat. No. 5,569,154 issued to Navetta discloses a mobile apparatus and a method for continuous processing of mercury laden soil to remove mercury from the soil. The apparatus comprises a screw desorber which includes an elongate closed shell and a motor driven hollow screw which rotates therein, a partial vacuum being maintained therein by means of a vacuum pump. Mercury laden soil enters the screw desorber at one end thereof through a first airlock valve which passes the soil without substantial loss of vacuum therein and travels therethrough under urging of the rotating hollow screw. A burner having a flame directed into the hollow screw incrementally heats the soil to first vaporize mostly water and then mercury contained therein, which vapors and air is withdrawn from the screw desorber at two different points, the first with vapor comprising primarily water vapor and the second downstream therefrom comprising mostly mercury vapor. The soil exits the screw desorber through a second airlock valve at the opposite end thereof which again passes the soil without substantial loss of vacuum therein. The vapor and any air removed from both points pass through respective cyclone cleaners to remove any dust contained therein, and then respective water and mercury condensers, and mercury traps to separate the mercury from the water. Such apparatus requires a closed shell and airlock valves to maintain the vacuum therein. The method comprises the steps of adding soil to one end of the screw desorber under such a vacuum, moving the soil from one end of the screw desorber to the other whereby the temperature of the soil is increased so as to cause mercury to vaporize from the soil, removing the vaporized mercury which is then condensed to form liquid mercury, and removing the soil from the screw desorber. However, such apparatus requires a closed shell which is airtight and does not function in a true continuous process since material does not enter and exit in a continuous manner through the airlock valves. No seal is formed between the screw and the shell.

U.S. Pat. No. 1,599,372 issued to C.J. Reed discloses an apparatus and a method for continuous processing of solid materials by applying heat thereto to effect mechanical separations such as by vaporizing liquids contained therein and chemical reactions. The apparatus comprises one or more elongate, generally horizontally disposed tubes through each of which a motor driven hollow screw extends which rotates therein. The tubes are connected in series one above the other at a slight incline by a plurality of upright tubes, the screws thereof being driven by respective interconnecting belts or chains, and the interiors of the screws connected by means of respective end shrouds for air flow therebetween. The material enters the topmost tube from a hopper and travels laterally and downwardly through the tubes. A center tube is heated by an external burner assembly and by an internally directed burner flame. A vacuum pump with tank system pulls a vacuum in the centermost tubes, draws offgasses including vaporized mercury therefrom the centermost tubes, and condenses mercury in the tank. Another system circulates air in the tubes adjacent the center most tubes counter to the flow of material therein to exchange heat between entering and exiting material, and includes a condenser and tank to remove water vapor. The centermost tubes which are under vacuum and the adjacent tubes which are not under vacuum are separated from airflow therebetween by the material in the upright tubes interconnecting such tubes. The retorting method comprises the steps of causing mercury bearing ore to move progressively from a lower level to a higher level into and out of a heated zone against a stream of air. While such apparatus functions as a continuous process, it is very complex and bulky, and the efficiency thereof is likely inherently poor due to the extensive lengths of tubes over which to lose heat. No seal is formed between the screw and the shell.

There is a need for an effective mercury retorting apparatus, system, and method of retorting mercury bearing materials using elevated temperatures and lowered pressure which is a continuous rather than a batch type process.

SUMMARY OF THE INVENTION

The invention comprises a mercury retorting apparatus for continuous removal of mercury from dry, semi-granular, and sludge materials such as soil, Merrill-Crowe precipitates, and scrubber mud contaminated with mercury wherein such materials are continuously fed thereinto, a mercury retorting system which allows continuous retorting without shutting down the system for removal of accumulated liquid mercury, water, and dust particles, and a method of continuous retorting of materials contaminated with mercury.

The mercury retorting apparatus of the invention is for mounting to a base such as a steel frame or concrete floor and comprises a container means operatively connectable to the mercury recovery system such that a vacuum can be pulled therein, a powered input means for continuously introducing the material into the container means without substantially reducing the vacuum within the container means, a heating means for heating the material within the container means so as to volatilize the mercury contained therein to form an offgas which includes air, mercury vapor, dust particles, and water vapor, an output means for removing the material from the container means without substantially reducing the vacuum within the container means, and offgas removal means for removing the offgas from the container means.

The input means typically comprises a powered auger or screw feed assembly and an inlet hopper, the screw feed assembly having an elongate feed tube having an elongate inlet opening in a first end portion thereof and a closely fitting elongate feed screw which is retained longitudinally within the feed tube and which is powered to rotate therein. The material seals against vacuum loss in the container means by being compacted so as to form a seal within the powered screw feed assembly during operation thereof. The inlet hopper is configured to contain a quantity of material and through a lower portion thereof which the first end portion of the feed tube with feed screw extends. The material gravity feeds from the inlet hopper into the inlet opening of the feed tube so as to be engaged by the feed screw for transport through the feed tube into the retorting container means. A second end portion of the feed tube typically includes a feed tube sealing means such as a flange and gasket which provides a seal between the feed tube and the container means against vacuum loss.

The container means typically comprises an elongate retorting tube of a larger diameter than the feed tube of the powered screw feed assembly, which feed tube with feed screw extends into a first end portion of the retorting tube. The retorting tube is powered to rotate and further comprises first and second seals which are attached to and seal respectively between the powered screw feed and the first end portion of the retorting tube and between the second end portion of the retorting tube and the output means. The seals are generally as disclosed in my U.S. previously issued U.S. Pat. No. 5,551,870 issued to Gale Sep. 3, 1996 which is herein incorporated by reference, but preferably using a metal bellows such as thin mild or stainless steel rather than a fabric bellows to better withstand the increased temperatures of retorting. The retorting tube is angled slightly vertically downwardly from the first end portion to the second end portion thereof so as to facilitate longitudinal movement of material contained in the retorting tube during rotation thereof and includes a plurality of radially spaced apart, elongate, longitudinally-extending paddles which are affixed to an inside surface of the retorting tube to stir the material contained therein during rotation thereof. The first end portion of the retorting tube is typically necked-down relative to the remainder of the retorting tube to a diameter closer to that of the feed screw tube so as so allow the first seal to be more compact.

The heating means is typically positioned so as to heat a mid-portion of the retorting tube between the first end portion and a second end portion thereof and typically comprises an elongate radiant heating kiln disposed about the retorting tube, having an elongate shell with opposite end plates each with an opening which closely passes about respective end portions of the retorting tube, a refractory and/or insulating means such as comprising a plurality of refractive ceramic bricks attached to the shell about the mid-portion of the retorting tube which line the inside of the shell, and a heat input means such as comprising an electrical heating coil means which is closely disposed about at least a portion of an inner surface of the kiln formed by the ceramic bricks lining the shell for heating air within a chamber formed between the shell and the retorting tube so as to heat the retorting tube and material contained therein.

The output means typically comprises an output hopper which is connected to the container means for receiving retorted material from the retorting tube, and a downwardly dependent outlet pipe assembly having an outlet pipe with an airlock means to allow retorted material to pass through without substantially reducing the vacuum within the container means, and wherein the means for removing the offgas from the container means comprises an offgas outlet pipe extending from and fluidly connected to the output hopper. The airlock means preferably comprises a pair of spaced apart slide valves positioned in the outlet pipe, comprising a stationary body connected to the outlet pipe with a movable slider partially disposed therein, and the portion of the outlet pipe therebetween. The slide valves can be sequentially opened and closed to admit retorted material from the output hopper and release the retorted material with minimal vacuum loss from the container means.

The mercury retorting system of the invention allows continuous retorting for removal and recovery of mercury from dry, semi-granular, and sludge materials contaminated with mercury, without shutting down the system for removal of accumulated liquid mercury, water, and dust particles. The retorting system comprises a mercury retorting apparatus typically of the type described above which includes an input means which is typically powered for continuously introducing the material into the container means, a mercury recovery system of the type having a condenser means which connects to the mercury retorting apparatus for cooling and condensing the mercury vapor from the air from the mercury retorting apparatus, and a vacuum means which connects to the mercury recovery system to draw a vacuum within the mercury retorting apparatus and mercury recovery system.

The mercury retorting system typically includes a pair of mercury recovery systems connected in parallel wherein each includes a pair of valves, one positioned between the retorting apparatus and the respective condenser means and the other positioned between the respective condenser and the vacuum means. This allows one of the mercury recovery systems to be shut off from the remainder of the mercury retorting system while the other of the mercury recovery systems remains operable.

The mercury recovery systems typically include a dust collector in series with and upstream from the first condenser means which comprises a horizontal condenser for removing dust from the offgas, a second condenser means comprising a vertical condenser in series with and downstream from the horizontal condenser for cooling the offgas to condense mercury vapor contained therein which was not condensed and removed by the horizontal condenser, and a collector tank which connects to the vertical condenser so as to collect mercury vapor condensed thereby. The condensers typically comprise tube-in-shell type condensers an elongate shell through which a plurality of tubes extend, wherein cooling water flows within the shell and the offgas flows through the tubes, and wherein the cooling water used with the condensers is connected in series so as to flow firstly through the vertical condenser and then through the horizontal condenser.

The method is for removal and recovery of mercury from dry, semi-granular, and sludge materials contaminated with mercury, without shutting down the system for removal of accumulated liquid mercury, water, and dust particles. The method comprises the steps of feeding the material into a container under vacuum by means of an input means for introducing the material into the container without substantially reducing the vacuum within the container, preferably continuously feeding the material into the container using a powered input means, transporting the material from the one end of the container to the other end thereof heating the material during transport within the container to a temperature sufficient to vaporize mercury contained therein, producing a mercury vapor during heating and transport of the material by volatilizing mercury contained in the material within in the container, removing the material from the other end of the container without substantially reducing the vacuum within the container, removing mercury vapor from the container, and condensing the mercury vapor removed from the container to liquid mercury for recovery thereof.

During the steps of heating and transport of the material within the container the material is typically tumbled so as to aid in volatilizing mercury therefrom. The material is typically removed from the container through a pair of spaced apart valves positioned in a material outlet pipe with a portion of the outlet pipe therebetween forming an airlock, which valves are sequentially opened and closed to admit retorted material from the output hopper and release the retorted material for collection with minimal vacuum loss from the container. The method is typically practiced wherein the condensing of the mercury vapor removed from the container to liquid mercury for recovery thereof is done in one mercury recovery system while another such mercury recovery system is emptied.

THE DRAWINGS

Figure 2:
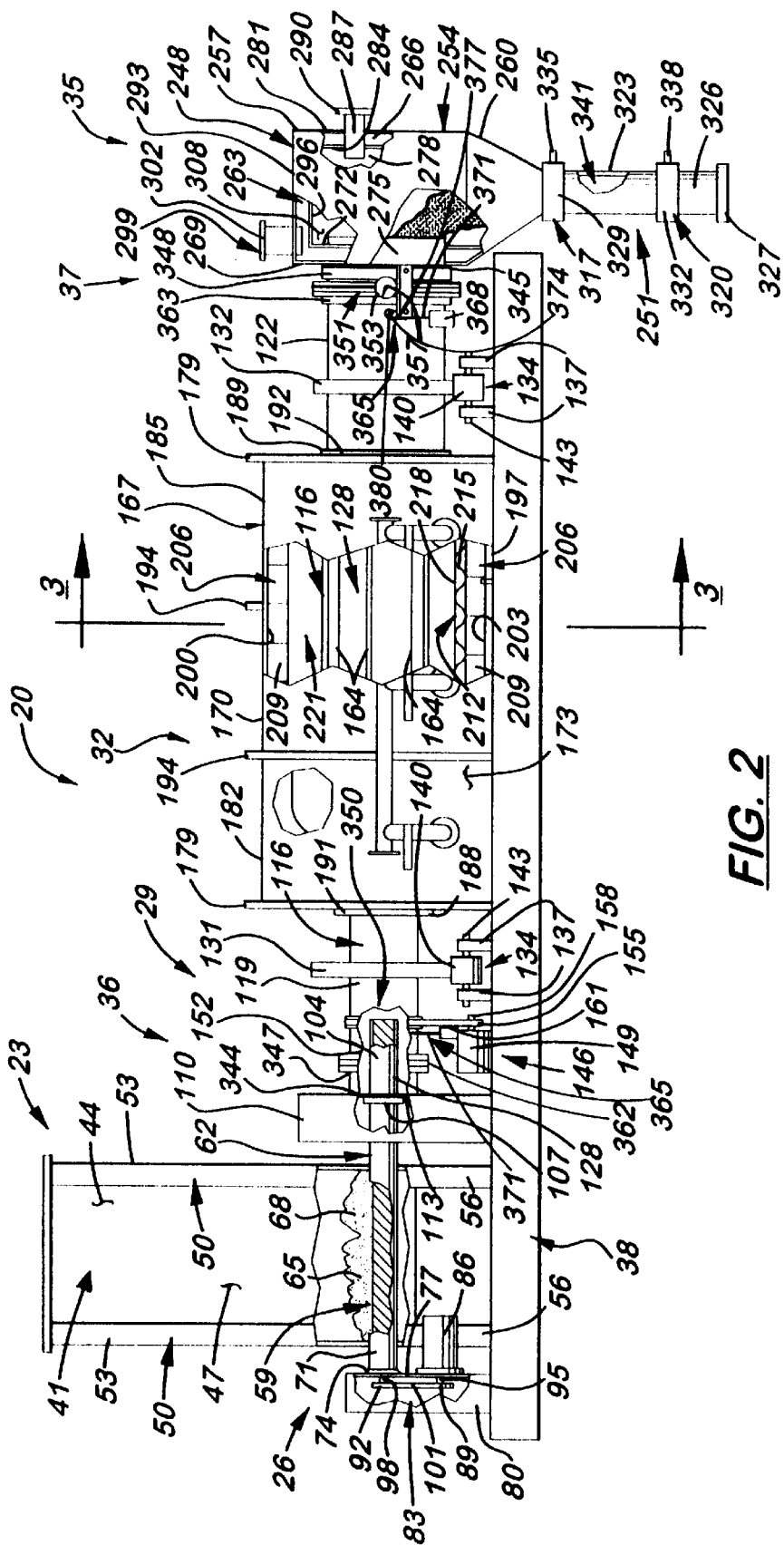
Figure 3:
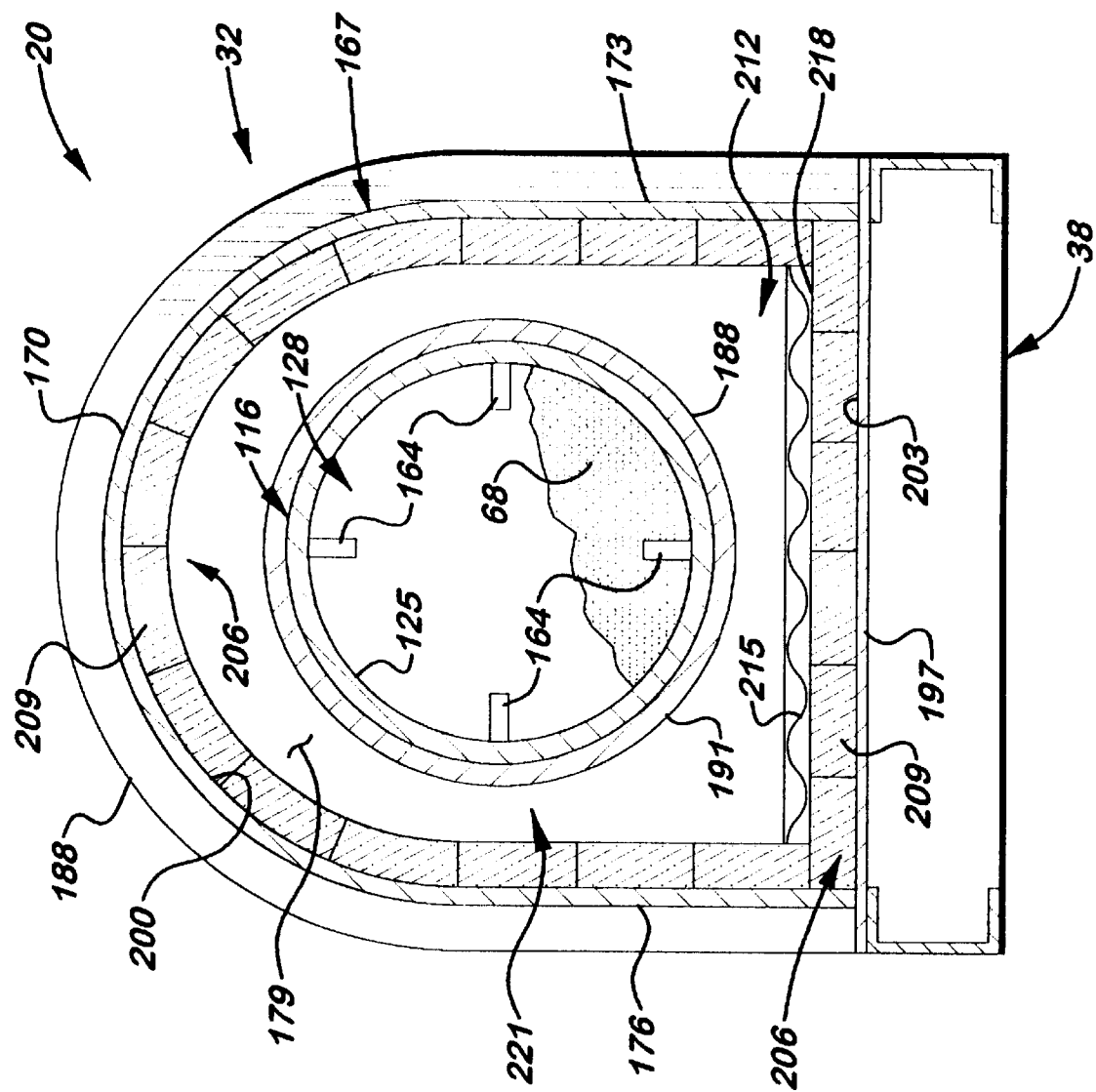
Figure 4:
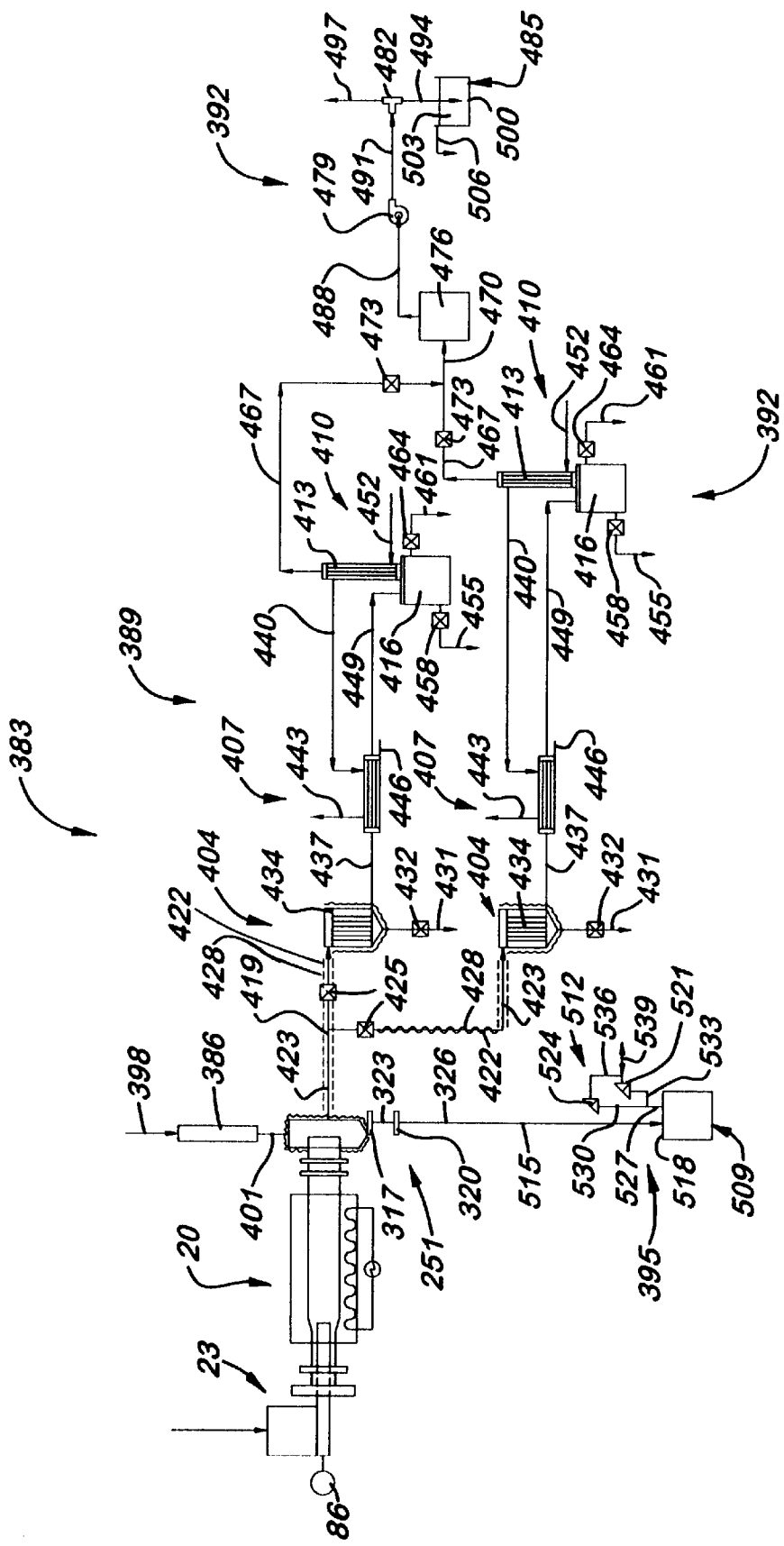

The best mode presently contemplated for carrying out the invention is illustrated in the accompanying drawings, in which:

FIG. 1 is a perspective view of the continuous mercury retorting apparatus of the invention;

FIG. 2, a partially broken side elevational view of such continuous mercury retorting apparatus, to a larger scale and with the air circulation assembly and blower removed for clarity;

FIG. 3, a lateral vertical sectional view taken on the line 3—3 of FIG. 2 showing the construction of the kiln and the rotary retorting tube therein; and FIG. 4, a diagrammatic representation of the continuous mercury retorting apparatus as part of a mercury retorting system, and method of mercury recovery.

DETAILED DESCRIPTION OF THE ILLUSTRATED EMBODIMENTS

Referring to FIGS. 1–3, therein is shown a continuous mercury retorting apparatus of the invention, retorting apparatus 20 which comprises a granulated material infeed means comprising inlet hopper 23 and a motorized screw feed assembly 26, a vacuum chamber means comprising a motorized retorting tube assembly 29, a heating means comprising a refractory kiln 32, a mercury ore outlet means comprising a valved output hopper 35, and a pair of seal means comprising a pair of front and rear seals 36 and 37, all of which directly or indirectly mounted to a floor or base 38.

Inlet hopper 23 comprises a body 41 having an upper rectangular inlet portion 44 and a tapered lower portion 47, and a plurality of legs 50 which are affixed at upper portions 53 thereof body 41 and which are affixed at lower ends 56 thereof to base 38. Motorized screw feed assembly 26 comprises an elongate feed screw 59 extending through an elongate feed tube 62 which itself is connected to and extends through lower portion 47 of inlet hopper 23. An elongate, upwardly disposed inlet opening 65 of feed tube 62 allows mercury bearing granular material 68 to enter feed tube 62 to be propelled by feed screw 59 therethrough. A first end 71 of feed tube 62 includes a flange 74 which is connected to a wall 77 of a housing 80 of motorized feed screw assembly 26. Motorized feed screw assembly 26 further comprises an electric feed screw drive assembly 83 which includes an electric motor 86 connected to front wall 77 of housing 80 and a pair of sprockets 89 and 92 connected to respective shafts 95 and 98 of electric motor 86 and feed screw 59. Sprockets 89 and 92 are operatively connected by means of a chain 101 such that electric motor 86 drives feed screw 59 within feed tube 62 so as to propel granular material 68 out a second end 104 thereof. Feed tube 62 is connected to a wall 107 of a housing 110, which is connected to base 38, at a flange 113 intermediate inlet opening 65 and second end 104 thereof with a gasket (not shown) between flange 113 and wall 107 providing an airtight seal therebetween.

Motorized retorting tube assembly 29 includes an elongate retorting tube 116 having a smaller diameter, necked-down input end 119, an output end 122, an interior surface 125 defining a retorting chamber 128 between respective ends 119 and 122 thereof, and a pair of annular rings 131 and 132 affixed about retorting tube 116 adjacent such respective ends 119 and 122 thereof. Retorting tube 116 is rotationally supported on base 38 by means of a pair of roller assemblies 134 attached to base 38 at respective annular rings 131 and 132, each roller assembly 134 comprising a pair of frame members 137 and a pair of rollers 140 rotationally connected therebetween on respective shafts 143. Motorized retorting tube assembly 29 further comprises an electric feed screw drive assembly 146 which includes an electric motor 149 connected to base 38, an annular ring sprocket 152 affixed about retorting tube 116 and a motor sprocket 155 connected to a shaft 158 of electric motor 149. Sprockets 152 and 155 are operatively connected by means of a chain 161 such that electric motor 149 drives retorting tube 116. Retorting tube 116 is angled slightly vertically downward from input end 119 to output end 122 such that during rotation thereof, granular material 68 moves longitudinally along retorting tube 116 from input end 119 toward output end 122. The stirring of granular material 68 is to facilitate removal of mercury therefrom and the longitudinal movement of such granular material 68 is enhanced by means of a plurality of stirring baffles 164 affixed to and which extend radially inwardly from interior surface 125 the entire length of retorting tube 116.

Refractive kiln 32 is disposed about retorting tube 116 and connected to base 38. Kiln 32 comprises a U-shaped shell 167 having an upper rounded portion 170 and dependent legs 173 and 176. A pair of end plates 179, one being affixed to shell 167 at each of an input end 182 and an output end 185 thereof, include respective holes 188 and 189 containing respective seals 191 and 192 through which respective input end 119 and output end 122 of retorting tube 116 extend. Seals 191 and 192 closely fit about retorting tube 116 to minimize heat loss from kiln 32. A pair of U-shaped ribs 194 are affixed to shell 167 between end plates 179 to stiffen and support shell 167. Shell 167, end plates 179, and ribs 194 are affixed to a bottom plate 197 which is affixed to base 38. An interior surface 200 of shell 167 and an upper surface 203 of bottom plate 197 are lined with a refractive insulating layer 206 made of a plurality of ceramic bricks 209 which are affixed to shell 167 and bottom plate 197, which bricks 209 can be made to be removable such as for replacement. An inductive or resistance heater 212 comprising one or more wires 215 supported by an insulator 218 is positioned atop bricks 209 over bottom plate 197 to heat the chamber 221 created by shell 167 and bottom plate 197 lined with bricks 209, retorting tube 116, and end plates 179.

Kiln 32 can also include an air circulation system 224 to provide convection heating in addition to radiant and refractive heating within chamber 221. Air circulation system 224 includes a squirrel cage blower 227 having a blower portion 230 powered by an electric motor 233, which blower 227 is mounted to base 38. An inlet pipe 236 connects lower leg 173 of shell 167 and chamber 221 to blower portion 230 allowing blower 227 to draw air from within chamber 221 through blower portion 230 and into a main outlet pipe 239 connected to a manifold pipe 242 having a main pipe 243 and a plurality of dependent L-pipes 245 which connect back to lower leg 173 of shell 167 and out into chamber 221. Air circulation system 224 can also be modified such as to comprise a natural gas fired heating system (not shown) which replaces inductive or resistance heater 212 as is known in the art.

Valved hopper 35 comprises a main hopper assembly 248 and a dependent valved outlet pipe assembly 251. Main hopper assembly 248 includes an outer box 254 having an upper portion 257 and a lower funnel portion 260, and an inner box 263 which fits within and is affixed to upper portion 257 of outer box 254 forming an air circulation chamber 266 therebetween. Outer box 254 includes a front wall 269 and inner box 263 includes a front wall 272 through which extends and is affixed to both walls 269 and 272 an outlet tube 275 of similar diameter and cross-section to retorting tube 116, which outlet tube 275 leads from chamber 128 of retorting tube 116 onto an outlet chamber 278 formed by outer box 254 and inner box 263, such outlet chamber 278 being of sufficient volume to allow settling of entrained dust therein. Outer box 254 includes a rear wall 281 and inner box 263 includes a rear wall 284 through which extends and is affixed to both walls 281 and 284 a mercury vapor outlet pipe 287 having a flange 290, which outlet pipe 287 leads from outlet chamber 278 for connection to a mercury recovery system (not shown). Outer box 254 includes a top wall 293 and inner box 263 includes a top wall 296 through which extends and is affixed to both walls 293 and 296 a heated air inlet pipe 299 having a flange 302, which inlet pipe 299 leads from air circulation chamber 266 for connection to the mercury recovery system. Outer box 254 includes a side wall 305 and inner box 263 includes a side wall 308 through which extends and is affixed to both walls 305 and 308 a heated air outlet pipe 311 having a flange 314, which outlet pipe 311 leads from air circulation chamber 266 for connection to the mercury recovery system.

Valved outlet pipe assembly 251 comprises a pair of slide valves 317 and 320, a center pipe 323, and an outlet pipe 326 having a flange 327. Valves 317 and 320 include respective bodies 329 and 332, and respective slides 335 and 338 which slidably move in bodies 329 and 332 and which are sealed against the entry of air thereinto. Pipe assembly 251 can be permanently affixed together such as by welding or the component parts thereof include flanges (not shown) and bolted together. Valve 317 is affixed to lower funnel portion 260 of main hopper assembly 248 in a similar manner. Valves 317 and 320 along with center pipe 323 comprise an airlock chamber 341.

Front and rear seals 36 and 37 are generally as described in my above mentioned patent and are required to accommodate the substantial longitudinal expansion and contraction of retorting tube 116, the middle portion of which is typically heated such that the temperature within the retorting tube 116 is as high as about 750° C. simultaneously with an absolute pressure therein of between about 200 and 600 Torr during the mercury retorting process. Each of front and rear seals 36 and 37 comprise a respective longitudinally movable, non-rotating flange rings (not shown) joined to a pair of respective fixed flange rings 344 and 345 which are affixed to respective walls 107 and 269 of housing 110 and outer box 254 of main hopper assembly 248 by means of a pair of respective tubular flexible bellows 347 and 348, typically made of thin corrugated metal to withstand the elevated temperatures involved in the retorting process, though fiberglass cloth or other such flexible material can also be used if capable of withstanding the elevated temperatures or isolated from the high temperatures in retorting tube 116. Such bellows 347 and 348 are attached to respective fixed flange rings 344 and 345, and the non-rotating flange rings such as by using metal bands (not shown) so as to seal therebetween.

Each of the non-rotating flange rings are maintained rotationally stationary yet longitudinally movable by means of a roller assembly 350 and 351 each comprising a pair of rollers 353 mounted to respective spindles 356 and 357 affixed to and laterally extending at opposite sides of each of such non-rotating flange rings. Rollers 353 roll on respective longitudinally-extending tracks 359 affixed to respective walls 107 and 269 of housing 110 and outer box 254 of main hopper assembly 248. The respective non-rotating flange rings each include an annular wear plate (not shown) typically made of brass but can be made of other suitable materials. A pair of respective rotating flange rings 362 and 363 are affixed about respective input and output ends 119 and 122 of retorting tube 116 which rotate therewith. Respective sealing surfaces (not shown) of the non-rotating flange rings and rotating flange rings 362 and 363 are in sealing contact, with the nonrotating flange rings biased toward respective rotating flange rings 362 and 363 so as to longitudinally move back and forth with expansion and contraction of retorting tube 116, with bellows 347 folding and unfolding as required to compensate for such thermal expansion and contraction.

The non-rotating flange rings are biased toward the respective rotating flange rings 362 and 363 preferably while maintaining a substantially constant interface pressure therebetween in any position for efficient sealing during expansion and contraction of retorting tube 116. This is accomplished by means of a plurality of hanging weights assemblies 365, each including a hanging weight 368 which is connected to a respective spindles 356 and 357 of the non-rotating flange rings by means of respective flexible cables 371. Cables 371 are supported by means of respective pulleys 374 which rotate on respective spindles 377 affixed by means of respective brackets 380 to respective tracks 359. The constant tension in cables 371 from respective hanging weights 368 translates into a constant interface pressure between the respective non-rotating flange rings and rotating flange rings 362 and 363 regardless of the longitudinal position thereof. Likewise, the diametral expansion and contraction of retorting tube 116 and rotating flange rings 362 and 363 is compensated for in such design of front and rear seals 36 and 37. Typically, at least three hanging weight assemblies 365 are used at each of input and output ends 119 and 122 of retorting tube 116, mounted so as to be distributed evenly radially about the respective front and rear seals 36 and 37 and evenly distribute the forces thereof for evenly distributed contact pressure.

Referring to FIG. 4, therein is shown retorting apparatus 20 as part of a mercury retorting system 383. In addition to retorting apparatus 20, retorting system 383 comprises an air heater 386, a pair of mercury recovery systems 389, a vacuum pump system 292, and a pressure controlled tank system 395.

Air heater 386 maintains the mercury vapor within outlet chamber 278 of main hopper assembly 248 at a sufficiently elevated temperature so as to not condense therein. Air heater 386 receives air from a blower (not shown) or other such air source through an air inlet pipe 398 which air is heated within air heater 386 by means such as inductance or resistance heating, or natural gas. Heated air exits air heater through an air outlet pipe 401 which is connected to heated air inlet pipe 299 of main hopper assembly 248. The heated air circulates through air circulation chamber 266 heating inner box 263 which heats the air with mercury vapor contained within outlet chamber 278. The heated air exits main hopper assembly 248 through heated air outlet pipe 311 which air can be filtered and returned into air heater 386, or directly exhausted directly to atmosphere. The heated air can also be used to shroud the rotating seals to maintain front seal 36 and rear seal 37 at a temperature above the boiling point of mercury within retorting apparatus 20 so as to prevent condensing thereof.

Each of mercury recovery systems 389 comprise a cyclonic dust collector 404, a horizontal condenser 407, and a vertical condenser collector assembly 410 comprising a vertical condenser 413 and a collector tank 416. Mercury recovery systems 389 receive air containing mercury vapor from outlet chamber 278 of main hopper assembly 248 through a mercury vapor outlet pipe 419 connected to mercury vapor outlet pipe 287 thereof which branches into respective dust collector inlet pipes 422 leading to respective dust collectors 404. Valves 425 in dust collector inlet pipes 422 allow running of both or of only one of mercury recovery systems 389 such as while the other thereof is being cleaned or other such maintenance thereto is performed. Mercury vapor outlet pipe 419 and each of dust collector inlet pipes 422 are insulated and heated such as by means of electrical resistance heating tape 428 wrapped therearound so as to maintain the mercury vapor contained in the air therein from condensing.

Dust collectors 404 separate and remove solid material suspended in the air released from the granulated material 68 during retorting by forming a vortex which performs such separation using centrifugal force. The suspended material removed by dust collectors 404 pass through respective lower discharge tubes 431 attached thereto having respective valves 432 for collection. Dust collectors 404 are each heated by means of a respective natural gas or electrical inductance or resistance heater 434 so as to prevent the mercury vapor contained in the air therein from condensing.

The relatively dustless air with mercury vapor travels from dust collectors 404 to respective shell and tube type horizontal condensers 407 through respective connecting pipes 437 therebetween and through respective tubes (not shown) thereof. Each of horizontal condensers 407 are of the reverse flow type cooled by chilled water flowing therethrough entering from a connection pipe 440 from the vertical condenser 413 of the respective vertical condenser collector assembly 410, flowing through the shell thereof, and exiting through an outlet pipe 443 for chilling by a chilling unit (not shown). Inside water passages (not shown) of horizontal condensers 407 are sealed from mainstream air with mercury vapor passages (not shown) so that the cooling water is not placed under vacuum. Horizontal condensers 407 are asymmetric or sloped such that liquid mercury condensed from the air with mercury vapor flows unobstructed from a bottom edge 446 thereof for collection.

Respective connection pipes 449 connect horizontal condensers 407 to collector tanks 416 of the respective shell and tube type vertical condenser collector assemblies 410. Vertical condensers 413 are affixed to respective collector tanks 416 and are of the same-direction flow type cooled by chilled water flowing therethrough entering from respective water inlet pipes 452 from the chilling unit, flowing through the shell thereof, and exiting to respective horizontal condensers 407 through connection pipes 440. Vertical condensers 413 accept air with any residual mercury vapor from the respective collector tank 416, which flows through respective tubes (not shown) thereof, with any such remaining mercury vapor being condensed in vertical condensers 413 to flow by gravity therefrom back into the respective collector tank 416. Inside water passages (not shown) of vertical condensers 413 are sealed from mainstream air with mercury vapor passages (not shown) so that the cooling water is not placed under vacuum. Condensed mercury in the form of liquid mercury is removed through respective mercury outlet pipes 455 near the bottom of collector tanks 416 which typically include a valve 458 to allow accumulation thereof in collector tanks 416 and to regulate the flow therefrom. Since water vapor also condenses from the air with mercury vapor, condensed water vapor in the form of water is removed through respective water outlet pipes 461 near the top of collector tanks 416 since water floats on top of liquid mercury, which water outlet pipes 461 typically include a valve 464 to allow accumulation thereof in collector tanks 416 and to regulate the flow therefrom. An outlet pipe 467 extends from each of vertical collectors 413 and merge together to a pipe 470 which connects to vacuum pump system 395, each of which outlet pipes 467 include a valve 473. One or more settling traps (not shown) can be provided in mercury recovery systems 389 to collect water condensed by horizontal condensers 407 and/or vertical condensers 413.

Vacuum pump system 392 comprises an absorber tank 476 to which pipe 470 connects, a vacuum pump 479 capable of maintaining mercury retorting system 383 at an absolute pressure of between about 200 and 600 Torr, a separator tee 482, and a seal pot 485. Absorber tank 476 contains sulfur impregnated carbon which removes any residual mercury vapor from the air travelling therethrough, which air exits through a pipe 488 through vacuum pump 479 and a pipe 491 into separator tee 482. Separator tee 482 separates out any residual water in the air which passes through a pipe 494 into seal pot 485 with air from which the water vapor has been removed exiting separator tee 482 through a pipe 497 to be exhausted from a stack (not shown). Seal pot 485 comprises a tank 500 which is filled with water 503 with pipe 494 extending thereinto so as to accept water but prevent air from escaping therethrough. An overflow pipe 506 extends from tank 500 at the upper surface of water 503 to allow excess accumulated water to exit therethrough for collection.

Pressure controlled tank system 395 comprises a tank 509 and a pressure relief assembly 512 such as known in industry to vent large gasoline and oil storage tanks. Retorted material from valved outlet pipe assembly 251 of valved output hopper 35 passes through a pipe 515 attached to output pipe 326 thereof which is fluidly connected to a top portion 518 of tank 509. Pressure relief assembly 512 is also fluidly attached to top portion 518 of tank 509 and comprises a pair of pressure relief valves 521 and 524 which are connected thereto by means of pipe 527 which splits into pipes 530 and 533. A pipe 536 connects pressure relief valves 521 and 524 with a pipe 539 allowing the selective venting of tank 506 to atmosphere. Pressure control assembly 512 functions to regulate the pressure within valved outlet pipe assembly 251, pipe 515, and tank 509 by venting air through pressure relief valve 521 displaced from tank 509 as retorted material fills tank 509 when the pressure therein reaches a predetermined pressure difference over ambient pressure. Likewise, pressure relief valve 524 allows ambient air to enter tank 509 such as when the granulated material 68 and air within tank 509 cool and contract.

Many variations of the apparatus and method of the invention can be made while staying within the same inventive concept. For example, the container means can be a non-rotating vessel into which the powered input means deposits material to be retorted, with the output means removing retorted material therefrom. The powered input means can comprise a sealed conveyor or other such means for continuously introducing material to be retorted into the container means without substantially reducing the vacuum within the container means. The heating means can be a gas or oil fired burner utilizing convection heating rather than electric refractive heating, with or without an air circulating blower. The output means can comprise a second powered auger or screw feed assembly, or a sealed conveyor or other such means for removing retorted material from the container means without substantially reducing the vacuum within the container means. There can be only a single or more than two mercury recovery systems of the offgas removal means. The condensers thereof can be of any type capable of condensing mercury vapor from the offgas, and oriented other than horizontally and vertically as shown.

Whereas this invention is here illustrated and described with reference to embodiments thereof presently contemplated as the best mode of carrying out such invention in actual practice, it is to be understood that various changes may be made in adapting the invention tr different embodiments without departing from the broader inventive concepts disclosed herein and comprehended by the claims that follow.

What is claimed is:

1. A mercury retorting apparatus for continuous removal of mercury from dry, semi-granular, and sludge materials contaminated with mercury as part of a mercury recovery system, the mercury retorting apparatus being for mounting to a base, comprising:

a container means operatively connectable to the mercury recovery system such that a vacuum can be pulled therein comprising an elongate retorting tube having first and second end portions, said retorting tube being powered to rotate;

a powered input means for continuously introducing the material into said retorting tube without substantially reducing the vacuum within said retorting tube, comprising a powered screw feed assembly having an elongate feed tube and a closely fitting elongate feed screw which is retained longitudinally within said feed tube and which is powered to rotate therein, said retorting tube being of a larger diameter than said feed tube such that said feed tube extends into said first end portion of said retorting tube, and wherein the material seals against vacuum loss in said retorting tube by being compacted so as to form a seal within said powered screw feed assembly during operation thereof;

an output means for removing the material from said retorting tube without substantially reducing the vacuum within said retorting tube;

first and second seals which are attached to and seal respectively between said powered screw feed and said first end portion of said retorting tube, and between said second end portion of said retorting tube and said output means, said first end portion of said retorting tube being necked-down relative to the remainder of said retorting tube to a diameter closer to that of said feed screw tube so as so allow said first seal to be more compact;

a heating means for heating the material within said container means so as to volatilize the mercury contained therein to form an offgas which includes air, mercury vapor, dust particles, and water vapor, said heating means being positioned so as to heat a mid-portion of said retorting tube between said first end portion and a second end portion thereof; and offgas removal means for removing the offgas from said container means.

2. A mercury retorting system for removal and recovery of mercury from dry, semi-granular, and sludge materials contaminated with mercury, comprising:

a mercury retorting apparatus of the type having a container means operatively connectable to a mercury recovery system such that a vacuum can be pulled therein, an input means for introducing the material into said container means without substantially reducing the vacuum within said container means, a heating means for heating the material within said container means so as to volatilize the mercury contained therein to form an offgas which includes ambient air, mercury vapor, dust particles, and water vapor, an output means for sealingly removing the material from said container means without substantially reducing the vacuum within said container means, and offgas removal means for removing the offgas from said container means;

a mercury recovery system of the type having a condenser means which connects to the mercury retorting apparatus for cooling and condensing the mercury vapor from the air from said mercury retorting apparatus; and a vacuum means which connects to said mercury recovery system to draw a vacuum within said mercury retorting apparatus and said mercury recovery system; and further comprising a second mercury recovery system of the type having a condenser means which connects to said mercury retorting apparatus for cooling and condensing the mercury vapor from the air from said mercury retorting apparatus, wherein said second mercury recovery system connects in parallel with said first mercury recovery system, and wherein each of said mercury recovery systems include a pair of valves, one positioned between said retorting apparatus and the respective condenser means and the other positioned between the respective condenser and the a vacuum means so as to allow one of said mercury recovery systems to be shut off from the remainder of said mercury retorting system while the other of said mercury recovery systems remains operable.

3. A method for the removal and recovery of mercury from dry, semi-granular, and sludge materials contaminated with mercury, comprising the steps:

feeding the material into a container under vacuum by means of an input means for introducing the material into the container without substantially reducing the vacuum within the container;

transporting the material from the one end of the container to the other end thereof;

heating the material during transport within the container to a temperature sufficient to vaporize mercury contained therein;

producing a mercury vapor during heating and transport of the material by volatilizing mercury contained in the material within in the container;

removing the material from the other end of the container without substantially reducing the vacuum within the container;

removing mercury vapor from the container; and condensing the mercury vapor removed from the container to liquid mercury for recovery thereof; and wherein the condensing of the mercury vapor removed from the container to liquid mercury for recovery thereof is done in one mercury recovery system while another such mercury recovery system is emptied.

* * * * *